Jan. 8, 1929.  1,698,047
W. H. BOUTELLE
OPHTHALMIC MOUNTING
Filed Sept. 10, 1925

Inventor
William H. Boutelle.
By Harry H. Styll.
Attorney

Patented Jan. 8, 1929.

UNITED STATES PATENT OFFICE.

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed September 10, 1925. Serial No. 55,550.

This invention relates to new and useful improvements in ophthalmic mountings, and consists of a novel construction of temple, together with means for securing the same to the lens rims of a spectacle.

The primary object of the present invention is to provide a hinge construction of the character stated, wherein the temples and the end pieces of the spectacle will have greater abutting surface with each other.

Another object of the invention is to provide a hinge connection which will be strong and durable in its construction and compact and neat in its appearance.

Another object is to provide an improved form of temple having a plurality of hinge ears, at least two of which are of different lengths.

Another object is to provide an end piece construction which will retain its alignment and trueness of working parts during use.

Still another object is to provide a temple having a plurality of hinge ears, at least two of which ears contact with the end piece in different vertical planes.

With these and other objects in view, the invention resides in the novel construction and combination of elements described in the following specification, illustrated in the accompanying drawings, and particularly pointed out in the appended claims.

In the drawings, wherein like characters of reference denote corresponding parts throughout the several views.

Figure 1:
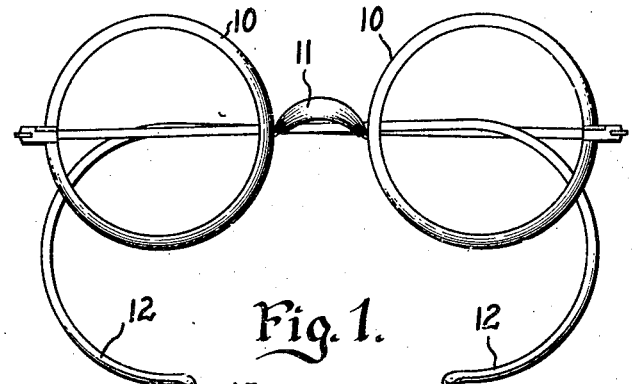
Figure 1 is a front view of a pair of spectacles embodying the present invention.

With reference to the accompanying drawing, in which is shown one practical embodiment of the present invention, the numeral 10 designates a pair of lens rims of an ordinary spectacle held together by means of a suitable bridge 11, and supported on the face of the wearer by the temple 12. Each of the lens rims 10 is split and terminates in the separated end pieces 13 and 14, which are secured together by the screw 15.

Figures 2, 3:
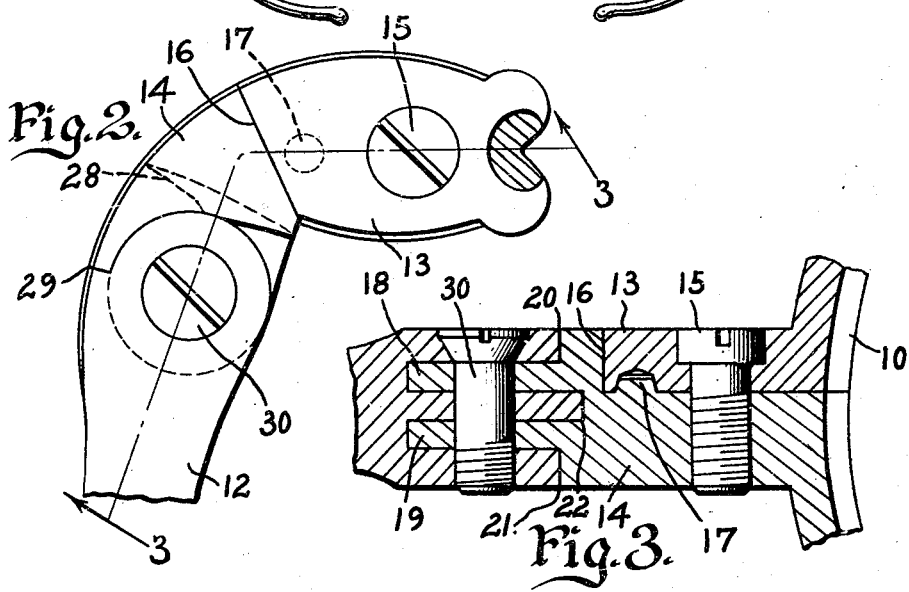
Figure 2 is an enlarged top plan view of the hinge connection.
Figure 3 is a sectional view on line 3—3 of Figure 2.
Figure 4:
Figure 4 is a top plan view of the temple per se.
Figure 5:
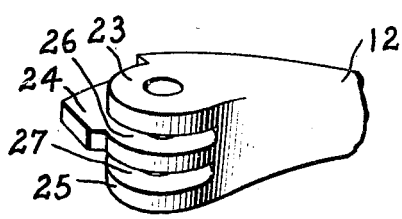
Figure 5 is a perspective view of a portion of the temple.

It will be noted by reference to Figure 3 that a portion of the upper face of the end piece 14 is cut away to provide a recess, in which is received the smaller end piece 13, and that the said end piece 14 extends beyond the end piece 13 and overlaps the end face thereof, as indicated at 16.

Formed integrally with the end piece 14, is a locating lug 17, which is received within a recess in the end piece 13, which lug assists in retaining the said end pieces in alignment with each other. The end piece 14 is also provided with the spaced ears 18 and 19, the recesses 20 and 21, and the central slot 22. The temple 12 is formed with a head having the spaced hinge ears 23, 24 and 25, forming the resultant slots 26 and 27, the said ear 24 being somewhat longer and wider than the ears 23 and 25, as will be seen from the drawings. The temple ears are arranged to interengage with the ears 18 and 19 of the end piece 14, the slot 22 thereof extending into the end piece a greater distance than the recesses 20 and 21 to accommodate the longer ear 24 of the temple.

By reference to Figure 2, it will be seen that due to the fact that the hinge ear 24 of the temple is longer than the ears 23 and 25, the ear 24 will abut against the end piece on the line 28, while the shorter ears 23 and 25 will abut thereagainst at the point 29 when the temple is opened, or, in other words, brought to a position at right angles to the lens rim.

When assembling the spectacle, the end pieces 13 and 14 are first brought together and the fastening screw 15 inserted therethrough, the lug 17 being received within the recess in the end piece 13. The hinge ears 23, 24 and 25 of the temple 12 are then interengaged with the ears 18 and 19 of the end piece 14, after which a fastening screw 30 is inserted through registering openings in the said end piece and temple ears, whereby to provide a pivotal connection between the temple and end piece.

From the foregoing description it will be readily appreciated that there has been provided a strong, sturdy, and neatly finished end piece and it will, of course, be understood that various modifications in the specific details of the invention may be found desirable, and the right is hereby reserved to make any such changes as properly fall within the scope of the appended claims without departing from or exceeding the spirit of the invention.

What is claimed is:

1. In a device of the character described a lens rim endpiece having alternate perforated hinge ears and hinge ear recesses concentric about the center of the perforations with one of the recesses extended beyond the concentric portion, a temple having alternate perforated hinge ears and hinge ear recesses concentric about the center of the perforations with one of the ears extended beyond the concentric portion and adapted to fit in the extended recess of the endpiece, the ears of the temple fitting into the recesses of the endpiece and the extended ear of the temple into the extended recess of the endpiece with the perforations of the ears of the temple and endpiece axially aligned, and pivot means through the aligned perforations, the said extended ear fitting into the extended recess increasing the rotative friction between the temple and endpiece to prevent a loose or falling temple.

2. In a device of the character described a hinge member having alternate perforated hinge ears and hinge ear recesses concentric about the center of the perforations with one of the recesses extended beyond the concentric portion, a second hinge member having alternate perforated hinge ears and hinge ear recesses concentric about the center of the perforations with one of the ears extended beyond the concentric portion and adapted to fit in the extended recess of the first hinge portion, the ears of the first hinge member fitting into the recesses of the second hinge portion with the extended ear of one into the extended recess of the other with the perforations of the second hinge members axially aligned, and pivot means through the aligned perforations, the extended ear in the extended recess increasing the rotative friction of the second hinge members.

WILLIAM H. BOUTELLE.